United States Patent
Magrini et al.

(10) Patent No.: US 12,239,969 B2
(45) Date of Patent: Mar. 4, 2025

(54) NOZZLES FOR REDUCED COKING AND PLUGGING IN HIGH TEMPERATURE OPERATIONS

(71) Applicant: Alliance for Sustainable Energy, LLC, Golden, CO (US)

(72) Inventors: Kimberly A. Magrini, Golden, CO (US); Michael William Sprague, Golden, CO (US); Zia Abdullah, Littleton, CO (US); Jessica L. Olstad-Thompson, Arvada, CO (US); Reinhard Seiser, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 542 days.

(21) Appl. No.: 17/740,458

(22) Filed: May 10, 2022

(65) Prior Publication Data

US 2022/0355260 A1    Nov. 10, 2022

Related U.S. Application Data

(60) Provisional application No. 63/186,248, filed on May 10, 2021.

(51) Int. Cl.
| | | |
|---|---|---|
| *B01J 8/20* | (2006.01) | |
| *B01J 4/00* | (2006.01) | |
| *B01J 8/18* | (2006.01) | |
| *C10G 11/18* | (2006.01) | |

(52) U.S. Cl.
CPC ............. *B01J 4/002* (2013.01); *B01J 8/1854* (2013.01); *B01J 8/1872* (2013.01); *B01J 8/20* (2013.01); *C10G 11/18* (2013.01); *B01J 2204/002* (2013.01); *B01J 2208/00902* (2013.01); *C10G 2300/1074* (2013.01); *C10G 2300/4056* (2013.01); *C10G 2300/4075* (2013.01)

(58) Field of Classification Search
CPC ........ B01J 4/002; B01J 8/1854; B01J 8/1872; B01J 8/20; B01J 2204/002; B01J 2208/00902; B01J 8/0278; B01J 8/1863; B01J 8/388; B01J 19/244; C10G 11/18; C10G 2300/1074; C10G 2300/4056; C10G 2300/4075
USPC ........................................................ 422/140
See application file for complete search history.

(56) References Cited

U.S. PATENT DOCUMENTS

| | | |
|---|---|---|
| 5,562,818 A | 10/1996 | Hedrick |
| 6,214,943 B1 | 4/2001 | Newton et al. |
| 6,346,219 B1 | 2/2002 | Hedrick |
| 6,503,461 B1 | 1/2003 | Burgard et al. |

(Continued)

OTHER PUBLICATIONS

Bazhlekov et al., "Numerical investigation of the effect of insoluble surfactants on drop deformation and breakup in simple shear flow", Journal of Colloid and Interface Science, 2006, vol. 298, No. 1, 2006, pp. 369-394.

(Continued)

*Primary Examiner* — Huy Tram Nguyen
(74) *Attorney, Agent, or Firm* — Michael A. McIntyre

(57) ABSTRACT

The present disclosure relates to a device for directing a coking-prone liquid to a high temperature environment, where the device includes an inner tube positioned concentrically within an outer tube, creating a first annular space between an outer wall of the inner tube and an inner wall of the outer tube and a first intermediate tube positioned concentrically around the outer tube, creating a second annular space.

21 Claims, 12 Drawing Sheets

(56) References Cited

U.S. PATENT DOCUMENTS

| | | |
|---|---|---|
| 8,282,885 B2 | 10/2012 | Palmas et al. |
| 8,778,038 B2 | 7/2014 | Goetsch et al. |
| 8,961,629 B2 | 2/2015 | Vimalchand et al. |
| 9,073,030 B2 | 7/2015 | Johnson |
| 9,523,042 B2 | 12/2016 | Baird et al. |
| 10,384,180 B2 | 8/2019 | Knowlen et al. |
| 2011/0058989 A1 | 3/2011 | Couch et al. |
| 2016/0090539 A1 | 3/2016 | Frey et al. |
| 2016/0244677 A1 | 8/2016 | Froehle |

OTHER PUBLICATIONS

Fu et al., "Theoretical Investigation of the Dynamics of a Gas-LiquidCoaxial Swirl Injector", Journal of Propulsion and Power, Jan.-Feb. 2011, vol. 27, No. 1, pp. 144-150.

Sedlak et al., "Production of Prototype Parts Using Direct Metal Laser Sintering Technology", Acta Polytechnica, 2015, vol. 55, No. 4, pp. 260-266.

Zhao et al., "Study on atomization characteristic of dual-orifice pressure-swirl injector", IOP Conference Series: Journal of Physics: Conference Series, FMIA 2017 2017, vol. 916, No. 012012, pp. 1-10.

M - M

NOZZLES FOR REDUCED COKING AND PLUGGING IN HIGH TEMPERATURE OPERATIONS

CROSS-REFERENCE TO RELATED APPLICATIONS

This application claims priority from U.S. Provisional Patent Application No. 63/186,248 filed on May 10, 2021 the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

There are many operations in both petroleum refineries and biorefineries where coking, fouling, and/or plugging of equipment pose serious operational issues. For example, the coprocessing of biobased oils with petroleum feedstocks can be particularly troublesome when cofeeding blends into unit operations running at high temperatures; e.g., a Davison Circulating Riser (DCR) fluid catalytic cracking (FCC) system. There remains, therefore, a need for improved devices and/or systems for feeding, among other things, bio-oil/petroleum blends into new and/or existing reactors to enable the introduction of biogenic carbon into existing hydrocarbon fuels and chemicals.

SUMMARY

An aspect of the present disclosure is a device for directing a liquid to a reactor, where the device includes an inner tube positioned concentrically within an outer tube, creating a first annular space between an outer wall of the inner tube and an inner wall of the outer tube and a first intermediate tube positioned concentrically around the outer tube, creating a second annular space. The first intermediate tube has a proximal end and a distal end, the inner tube has a proximal end and a distal end, the outer tube has a proximal end and a distal end, and the proximal end of the inner tube is configured to receive the liquid. A portion of the first annular space is near the proximal end of the inner tube and the proximal end of the outer tube is configured to receive a first gas. The distal end of the inner tube contains an outlet configured to release the liquid. The distal end of the inner tube and the distal end of the outer tube are substantially aligned and form a gap between the outer wall of the inner tube and the inner wall of the outer tube. The gap is configured to direct the first gas to the liquid exiting the second end of the inner tube, and the second end of the outer tube terminates with a tip configured to mix the liquid with the first gas and to direct the liquid and the first gas into the reactor.

In some embodiments of the present disclosure, the inner tube may have an inside diameter $D_I$ and the outer tube may have an inside diameter $D_O$, where a ratio of $D_O$ to $D_I$ is between about 1.1 and about 20. In some embodiments of the present disclosure, the tip may have an inside diameter $D_T$, where a ratio of $D_T$ to $D_O$ is between about 0.01 and about 1.0. In some embodiments of the present disclosure, the first annular space may be configured so that the first gas has a velocity between about 0.1 m/s and about 30 m/s. In some embodiments of the present disclosure, $D_I$ may be configured so that the liquid has a velocity between about 0.1 m/s and about 100 m/s. In some embodiments of the present disclosure, $D_T$ may be configured so that the combination of the liquid and the first gas have a velocity between about 4 m/s and about 200 m/s. In some embodiments of the present disclosure, the first annular space may be configured so that the first gas has a Reynolds number between about 1 and about 20,000.

In some embodiments of the present disclosure, the first intermediate tube may be configured to be positioned concentrically within a tubular portion of the reactor and the tubular portion may have a wall with an inner surface, such that the outer surface of the outer tube and the inner surface of tubular portion form a third annular space. In some embodiments of the present disclosure, the tubular portion may be configured to receive a flow comprising a solid and a second gas, where the flow is configured to be directed to the third annular space at a reference Point B, the flow is configured to flow substantially parallel with the first gas, and the outer tube has a length (H) defined as the distance between the tip of the nozzle (Point C) and Point B. In some embodiments of the present disclosure, a ratio of $D_I$ to H may be between about 5 and about 5,000. In some embodiments of the present disclosure, at least one of the inner tube, the outer tube, or the first intermediate tube may be constructed of titanium.

In some embodiments of the present disclosure, the first intermediate tube may have a length (U) between Point B and the distal end of the first intermediate tube (Point D), that defines a ratio of U to H between about 0 and 100. In some embodiments of the present disclosure, the ratio of U to H may be between 0 and 1.0. In some embodiments of the present disclosure, the intermediate tube may have an inside diameter, D', that defines a ratio of D' to DO between greater than 1 and about 2.0. In some embodiments of the present disclosure, the second annular space may have a width $W_{RI}$ defined by the distance between the outer wall of the outer tube and the inner wall of the first intermediate tube, the third annular space may have a width $W_{RO}$ defined by the distance between the outer wall of the first intermediate tube and the inner wall of the tubular portion of the reactor, and a ratio of $W_{RO}$ to $W_{RI}$ may be between about 0.1 and about 10. In some embodiments of the present disclosure, the distal end of the first intermediate tube may contact and terminate at the outer wall of the outer tube. In some embodiments of the present disclosure, the second annular space may be configured to receive a heat transfer fluid.

In some embodiments of the present disclosure, the device may further include a second intermediate tube positioned concentrically between the inner tube and the outer tube, such that the second intermediate tube has a proximal end and a distal end, and the second intermediate tube divides the first annular space into an inner portion between the outer wall of the inner tube and the inner wall of the outer tube and an outer portion between the outer wall of the second intermediate tube and the inner wall of the outer tube. In some embodiments of the present disclosure, the inner portion of the first annular space near the distal end of the second intermediate tube may be configured to receive a third gas, the distal end of the second intermediate tube may be positioned near the distal end of the inner tube, and the distal end of the second intermediate tube may be configured to discharge the third gas. In some embodiments of the present disclosure, the reactor may include a circulating fluidized bed reactor, and the liquid may include a pyrolysis oil and a vacuum gas oil. In some embodiments of the present disclosure, the device may further include a mechanical insert positioned within the third annular space below Point B.

BRIEF DESCRIPTION OF DRAWINGS

Some embodiments are illustrated in referenced figures of the drawings. It is intended that the embodiments and figures disclosed herein are to be considered illustrative rather than limiting.

REFERENCE NUMERALS

Figure 1:
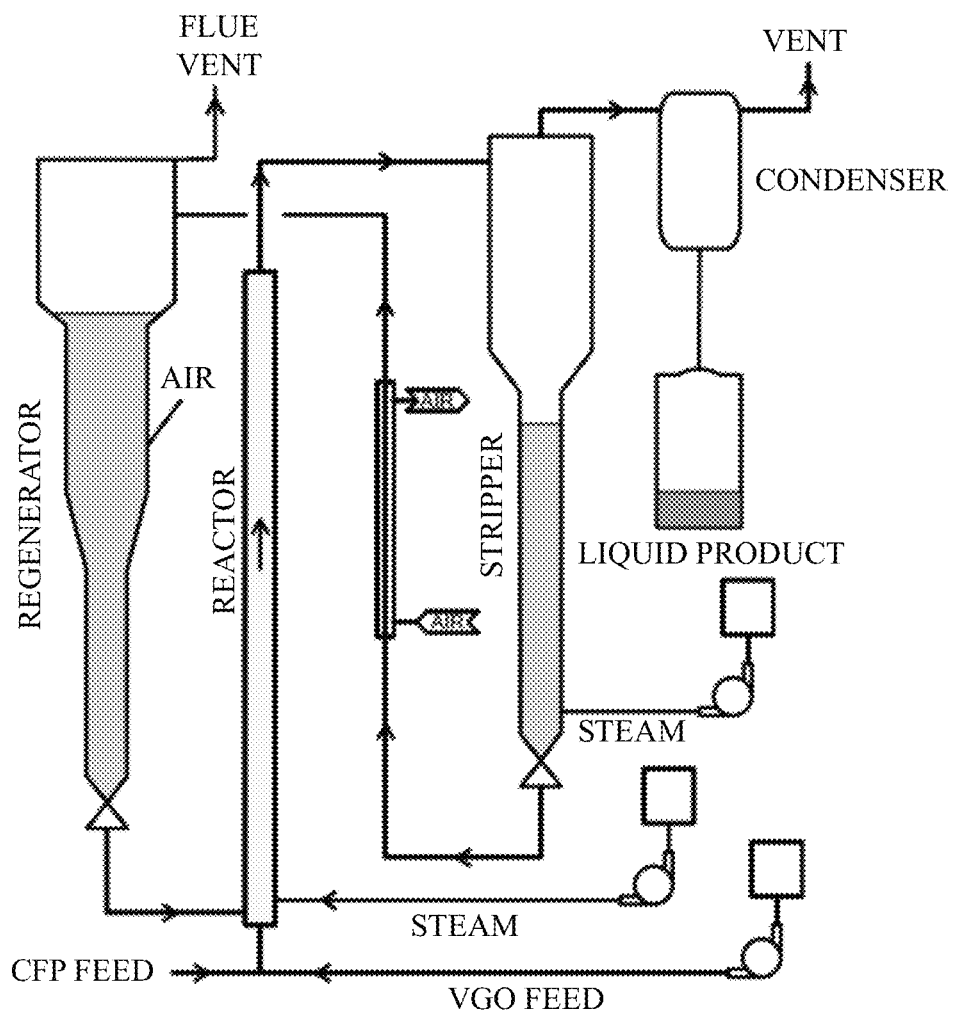
FIG. 1 illustrates a flowchart of a Davison Circulating Reactor (DCR).

100 . . . nozzle
110 . . . tip/outlet (for liquid feed)
115 . . . gap
120 . . . inner tube
130 . . . annular space
140 . . . outer tube
150 . . . first inlet (for liquid feed)
160 . . . second inlet (for first fluid)
170 . . . first intermediate tube
175 . . . third inlet (for third fluid)
180 . . . second intermediate tube
185 . . . fourth inlet (for fourth fluid)
R100 . . . reactor
R110 . . . reactor wall
R120 . . . reactor annular space
R130 . . . fluidizing gas inlet (for second fluid)
R140 . . . catalyst feed line
$D_R$ . . . inside diameter of reactor
$D_O$ . . . inside diameter of outer tube
$D_I$ . . . inside diameter of inner tube
$D_T$ . . . inside diameter of tip
$D'$ . . . inside diameter of first intermediate tube
$W_A$ . . . width of annular space between inner/outer tubes
$W_R$ . . . width of annular space between reactor/outer tube
$W_{RI}$ . . . width of inner portion of $W_R$
$W_{RO}$ . . . width of outer portion of $W_R$

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to nozzle designs that reduce or eliminate coking/plugging/fouling during high temperature co-processing of bio-oils with petroleum feedstocks to produce biogenic hydrocarbon fuels and/or chemicals. For example, feeding fast-pyrolysis oil (FP oil) and/or catalytic-fast-pyrolysis oil (CFP oil) into a hot reactor (e.g., ~550° C. and higher) is challenging, because these oils are reactive and break down inside the nozzles that direct them into high temperature environments (e.g., a DCR). The result is often the formation of coke deposits that ultimately block the nozzle, resulting in reactor downtime and lost production. This problem can be exacerbated at small scale (e.g., pilot scale), because of, for example, large surface-to-volume ratios that increase heat transfer to the oil. Small orifices further increase adhesion forces of particles compared to the hydrodynamic forces created by the fluids flowing through the nozzle. The designs described herein apply to laboratory-scale nozzles, pilot-plant scale nozzles, and commercial-scale nozzles.

FIG. 1 illustrates an example of a DCR system (i.e., a fluid catalytic cracking (FCC) reactor) for cofeeding CFP oil and vacuum gas oil (VGO), a petroleum feedstock, to produce biogenic hydrocarbons, according to some embodiments of the present disclosure. As shown, the two oils can be co-fed into the DCR using a single nozzle. This can provide better cooling than feeding the two liquids through separate nozzles. However, for this exemplary feed, the CFP oil is in physical and thermal contact with the heated VGO (between about 100° C. and about 150° C.), which, when using incumbent nozzle designs, frequently results in the nozzle plugging. In this configuration, without the design changes and modifications described herein, incumbent nozzles often become plugged after only 10 to 20 minutes on-line. Although FIG. 1 illustrates a specific FCC reactor, a DCR system, this is for exemplary purposes only. The nozzle designs described herein may provide improved performance and longer on-line times in a variety of other high-temperature reactors, where the reactants directed to reactors are prone to coking/plugging/fouling. For simplicity, the coking-prone liquid, e.g., CFP oil/VGO oil mixture, is referred to herein as the "feed liquid".

Figure 2A:
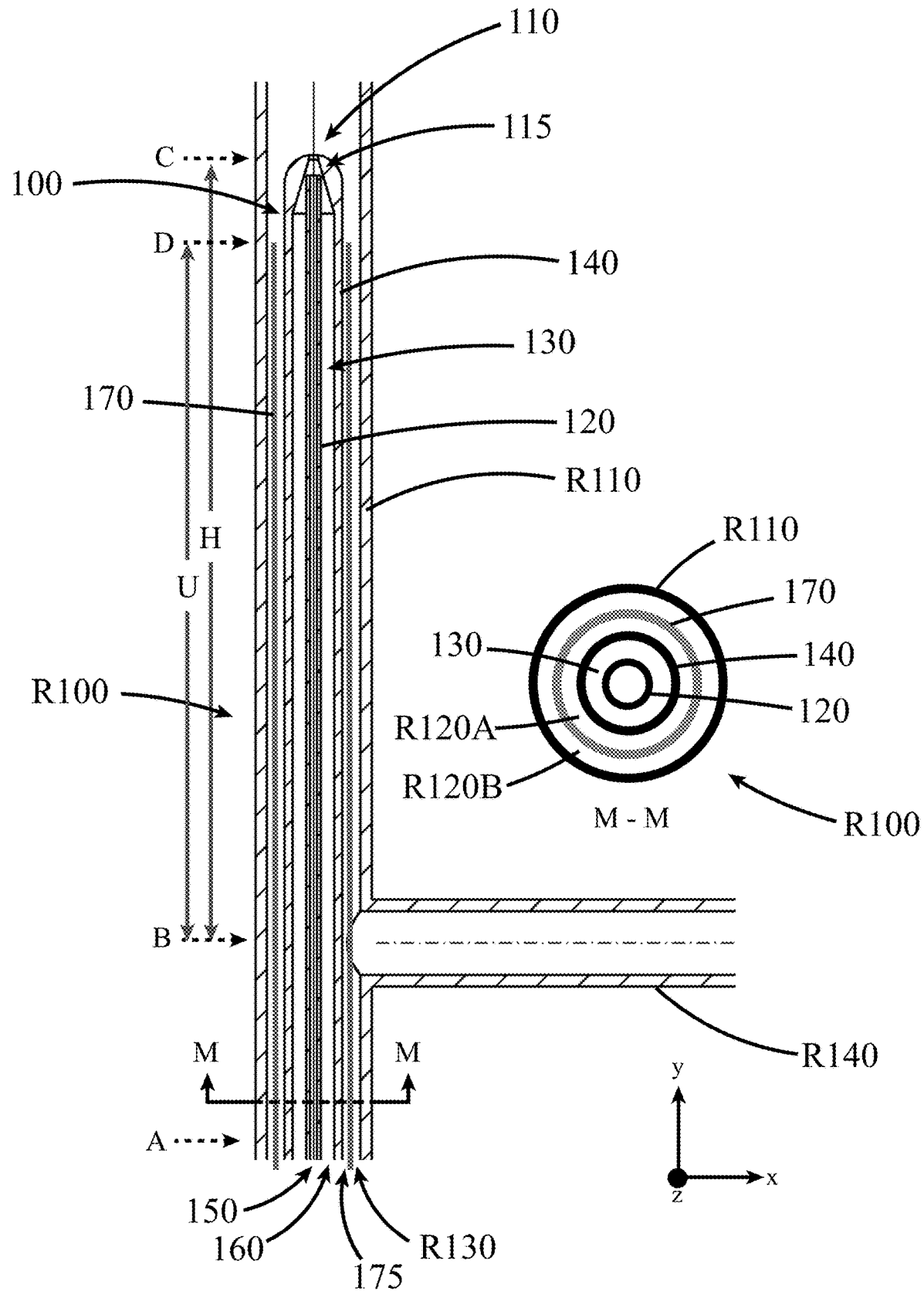
FIGS. 2A through 2G illustrate nozzle designs, according to some embodiments of the present disclosure.

FIG. 2A illustrates an exemplary nozzle 100 designed to mitigate, if not eliminate, plugging issues, according to some embodiments of the present disclosure. The nozzle 100 includes a concentric-tube (i.e., concentric-pipe) design constructed of an inner tube 120 placed concentrically within an outer tube 140, with both tubes (120 and 140) placed concentrically within a reactor tube R110 (e.g., a portion of a DCR). The placement of the inner tube 120 within the outer tube 140 creates an annular space 130. Similarly, the placement of the outer tube 140 within the reactor wall R110 creates a second annular space referred to herein as a "reactor annular space" R120. In addition, the exemplary nozzle 100 illustrated in FIG. 2A includes a fourth tube positioned between the reactor wall R110 and the outer tube 140. This fourth tube is referred to herein a "first intermediate tube" (i.e., "heat shield"). The first intermediate tube 170 further divides the reactor annular space R120 into an inner portion and an outer portion, which in FIG. 2A, are indicated with reference numerals R120A and R120B, respectively. As shown below, the division of the internal space within the reactor wall R110 creates isolated internal volumes, each with its own dedicated purpose, where the combination of the internal volumes achieves, among other things, continuous, plug-free delivery of the feed liquid into the reactor for long periods of time. Each of these volumes will be referred to herein by their respective spaces illustrated in FIG. 2A, e.g., annular space 130, inner reactor annular space R120A, and outer reactor annular space R120B, and the internal volume of the inner tube 120.

Referring again to FIG. 2A, each of the inner tube 120, the outer tube 140, the first intermediate tube 170, and the reactor wall R110 may be positioned concentrically and in parallel to each other relative to a reference axis, e.g., the y-axis illustrated in FIG. 2A. An inlet 150 (at Level A on the y-axis of the reactor R100) may be configured to receive and direct the feed liquid (not shown) to the proximal end of the inner tube 120. In some embodiments of the present disclosure, a feed liquid (e.g., VGO mixed with CFP oil) may contain a gas (e.g., $N_2$ and/or steam), which, among other things, may provide higher fluid velocities through the inner tube. Simultaneously, a first fluid (e.g., steam, nitrogen, etc., not shown) may be directed to an inlet 160 (also at Level A on the y-axis of the reactor R100), which receives and directs the first fluid into the annular space 130, at the proximal ends of the inner tube 120 and the outer tube 140. The feed liquid and the first fluid may then flow in parallel, isolated from each other, thereby preventing undesirable reactions from occurring, until the feed liquid reaches the distal end (i.e., Level C) of the inner tube 120, at which point the feed liquid exits the distal end of the inner tube 120 to mix with the first fluid before the resultant mixture exits the nozzle 100 at the nozzle tip 110 (at Level C in FIG. 2A).

As illustrated in FIG. 2A, in some embodiments of the present disclosure, the distal end of the inner tube 120 may be positioned slightly below the distal end of the outer tube 140 in the y-axis direction, resulting in a gap 115 between the distal end of the inner tube 120 and the distal end of the outer tube 140. Further, in some embodiments of the present disclosure, the wall of the outer tube 140 may be tapered towards the centerline of the inner tube 120, thereby narrowing the annular space 130. In some embodiments of the present disclosure, this narrowing can result in the inner wall of the outer tube 140 approaching the outer wall of the inner tube 120. Among other things, this narrowing can reduce the cross-sectional area (CSA) of the annular space 130 available for fluid flow, resulting in the first fluid achieving a relatively high velocity at the point where it mixes with the feed liquid, immediately before the resultant first fluid/feed liquid mixture exits the nozzle 100 at the tip 110, also at a relatively high velocity.

Referring again to FIG. 2A, the combined mixture of the liquid feed (e.g., bio-oil, VGO) and the first fluid exiting the tip 110 of the nozzle 100 mixes with another mixture of catalyst originating, in this exemplary case, from a catalyst regenerator (see FIG. 1) and a second fluid stream (e.g., nitrogen). As described above, the exemplary nozzle 100 includes three concentric tubes (inner tube 120, outer tube 140, first intermediate tube 170) positioned concentrically within another tube and/or pipe, in this example, a portion of a reactor R100 itself, e.g., a DCR. Solid catalyst returning from the regenerator is directed through a catalyst feed line R140 where, in this example, the solid catalyst is combined and mixed with an up-flowing second fluid, for example nitrogen, which enters the reactor R100 at inlet R130 (at Level A on the y-axis). The nozzle 100, in this example, is positioned concentrically within a section of the reactor R100, where the inner surface of the reactor wall R110 and the outer surface of the nozzle's outer tube 140 form the reactor annular space R120, which as described above, is further divided by the first intermediate tube 170 (i.e., a heat shield) into an inner portion R120A and an outer portion R120B. The second fluid (e.g., $N_2$) may be directed to the outer portion of the reactor annular space R120B at Level A, where it flows upwards, parallel to the flow of the first fluid flowing through the first annular space 130 and parallel to the flow of the feed liquid flowing through the inner tube 120. At Level B, the second fluid mixes with the regenerated solid catalyst entering through the catalyst feed line R140, such that the solid catalyst becomes entrained and is transported through the inner portion of the reactor annular space R120B, where at Level C, the fluidized catalyst mixes with the mixture of the first fluid and feed liquid exiting the tip 110 of the nozzle 100.

Referring again to FIG. 2A, the first intermediate tube 170 (i.e., heat shield) and the resultant inner portion of the reactor annular space R120A, "shield" the first fluid flowing through the annular space 130 from the relatively hot fluidized solid catalyst stream. Thus, the first intermediate tube 170 can reduce, minimize, and/or control heat transfer from the solid catalyst to the first fluid. This, as a result, can reduce, minimize, and/or control heat transfer to the feed liquid flowing through the inner tube 120. In other words, the inner portion of the reactor annular space R120A and the first intermediate tube 170 provide resistances to heat transfer from the hot fluidized solid catalyst flowing through the outer portion of the reactor annular space R120B to the temperature-sensitive feed liquid flowing through the inner tube 120.

The arrangement illustrated in FIG. 2A can minimize or eliminate plugging at the nozzle tip 110 because of several factors. First, referring again to FIG. 2A, the nozzle tip 110 at Level C is positioned at a Height H relative to the point where the catalyst is fluidized by the second fluid, at Level B, where the catalyst enters through the catalyst feed line R140. This height H, among other things, allows the fluidized solid catalyst to develop a defined flow in the outer portion of the reactor annular space R120B by the time it reaches Level C to co-mix with the feed liquid/first fluid mixture exiting the nozzle tip 110. A defined flow enables even distribution of the fluidized solid catalyst throughout the cross-sectional area available for flow in the outer portion of the reactor annular space R120B, which in turn, ensures uniform mixing of the fluidized solid catalyst with the mixture exiting the nozzle tip 110.

In addition, the height H between Levels B and C enables the feed liquid flowing through the inner tube 120 to preheat (or cool) to a desired target temperature. For example, the first fluid may include steam entering the reactor R100 at inlet 160 at a temperature that is higher than the feed liquid entering at inlet 150, flowing in parallel to the first fluid. As a result, the length of the inner tube 120 corresponding to H may provide sufficient surface area for the steam flowing through the annular space 130 to sufficiently heat the feed liquid flowing through the inner tube 120 to some target metric; e.g., exit temperature, liquid viscosity, liquid surface tension, etc. In some embodiments of the present disclosure, dropping the viscosity of a feed liquid below some maximum allowable viscosity may be important to minimize the pressure drop through the inner tube 120 and/or the pressure drop occurring at the nozzle tip 110, and/or to obtain a desired spray profile and/or droplet size of the feed liquid/first fluid mixture exiting the nozzle tip 110. Further, in some embodiments of the present disclosure, a shorter Height H may reduce the heating of the second fluid by the catalyst. This in turn can reduce the heating of the feed liquid by the second fluid.

The nozzle design illustrated in FIG. 2A offers other advantages regarding heat transfer, which can further reduce or eliminate plugging of the nozzle 100 by coking-prone liquid feed materials. So, in some embodiments, instead of providing heat to the feed liquid, a first intermediate tube 170, i.e., heat shield, and the resultant inner portion of the reactor annular space R120A, may "shield" the first fluid flowing through the annular space 130 from the relatively hot fluidized solid catalyst stream flowing through the outer portion of the reactor annular space R120B. Thus, the first intermediate tube 170 can reduce, minimize, and/or control heat transfer from the solid catalyst to the first fluid. This, as a result, can reduce, minimize, and/or control heat transfer to the feed liquid flowing through the inner tube 120. In other words, the inner portion of the reactor annular space R120A and the first intermediate tube 170 provide resistances to heat transfer from the hot fluidized solid catalyst flowing through the outer portion of the reactor annular space R120B to the temperature-sensitive feed liquid flowing through the inner tube 120.

Referring again to FIG. 2A, another control variable for heat transfer from the hot solid catalyst to the liquid feed may be the introduction of a third fluid (not shown) into the inner portion of the reactor annular space R120A. Thus, in some embodiments of the present disclosure, a third fluid may be directed to the annular space R120A between the outer tube 140 and the first intermediate tube 170 at an inlet 175 positioned at about Level A. The third fluid may then flow through the inner portion of the reactor annular space R120A in parallel with the liquid feed (in the inner tube 120), the first fluid (in the annular space 130), and the second fluid/catalyst (in the outer portion of the reactor annular space R120B). In some embodiments of the present disclosure, a third fluid may be a heat transfer fluid or coolant. For example, water may be directed to the inner portion of the reactor annular space R120A. In some embodiments of the present disclosure, the distal end of a first intermediate tube 170 may be closed (see FIGS. 2C and 2D), thereby preventing the backflow of material into the inner portion of the reactor annular space R120A. In such a nozzle 100, the inner portion of the reactor annular space R120A may be evacuated of all mass (e.g., subjected to a vacuum) and/or filled with an insulating material. In addition, sealing the distal end of the inner portion of a reactor annular space R120A may prevent catalyst from entering that space. In some embodiments of the present disclosure, the inner portion of the reactor annular space R120A may contain stagnant gas or may be evacuated (e.g., maintained at a vacuum that is less than 1 atmosphere) to further insulate against heat conduction/convection across R120A. So, the inner portion of the reactor annular space R120A formed by the first intermediate tube 170 may provide a number of ways to control the heat transfer from the hot catalyst to the feed liquid, both by active heat transfer using a heat transfer fluid and/or passively by the addition of resistance(s) to heat transfer by the use of insulation or vacuum.

Figure 2B:
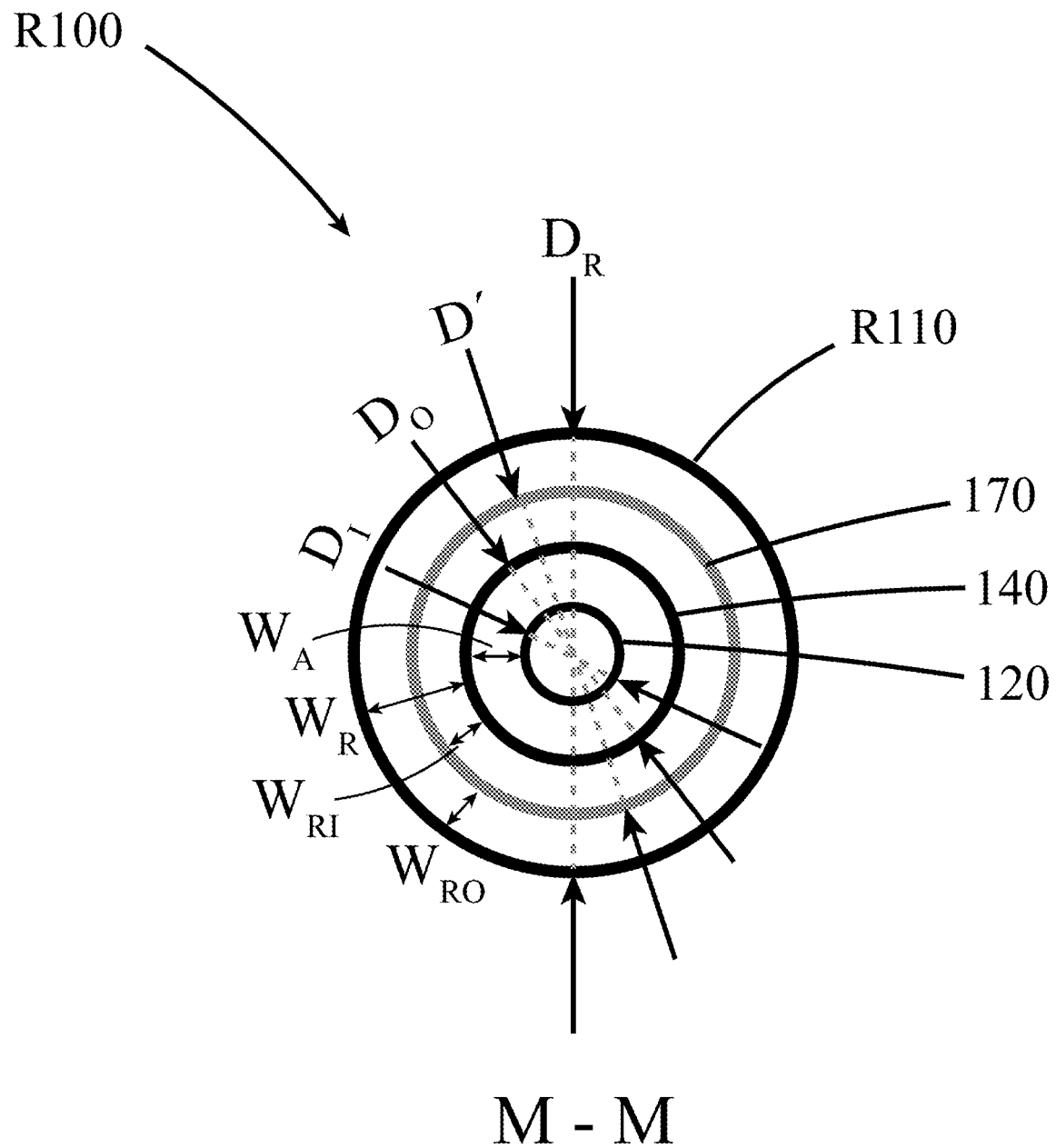

FIG. 2B illustrates a cross-sectional view of the reactor R100 and nozzle 100 shown in FIG. 2A and calls out a number of inside diameters of the elements described above: $D_I$=inside diameter of the inner tube 120; $D_O$=inside diameter of the outer tube 140; D'=inside diameter of the first intermediate tube 170; and $D_R$=inside diameter of the reactor wall R110. Among other design variables, these diameters may be important for the reliable operation of the nozzles 100 described herein, especially plug-free operation for extended periods of time; e.g., from days to months. Some of these design variables are summarized in Table 1 for an exemplary pilot-scale reactor and for scale-up to larger reactors in Table 3. Dimensions for the pilot-scale reactor are provided in Table 2. Both FIGS. 2A and 2B illustrate the various tubes with circular cross-sectional shapes. However, other cross-sectional shapes fall within the scope of the present disclosure; e.g. elliptical, square, triangular, etc.

TABLE 1

Pilot-Scale Nozzle Design Variables

| Design Variable | Units | min | max |
| --- | --- | --- | --- |
| Residence time in inner tube 120 | [s] | 0.02 | 0.2 |
| Velocity in inner tube 120 | [m/s] | 1 | 20 |
| Reynolds number in inner tube 120 | [-] | 10 | 3000 |
| Heat transfer through inner tube 120 | [W/mm2] | 0.02 | 0.3 |
| Heat transfer to steam/$N_2$ (first gas in 130) and feed liquid with $N_2$ (in 120) | [W/mm2 outer tube inner area] | 0.01 | 0.12 |
| Residence time in annular space 130 | [s] | 0.1 | 1 |
| Velocity in annular space 130 (for narrowest portion of outer tubes having varying inside diameter) | [m/s] | 0.2 | 10 |
| Reynolds number in annular space 130 (for widest portion of outer tubes having varying inside diameter) | [-] | 10 | 3000 |
| CFP Oil in Oil mixture | [vol %] | 1 | 20 |
| Velocity at tip/outlet (combined stream/mass exiting at tip 110) | [m/s] | 10 | 100 |

TABLE 1-continued

Pilot-Scale Nozzle Design Variables

| Design Variable | Units | | min | max |
|---|---|---|---|---|
| Reynolds number at tip/outlet (combined stream/mass exiting at tip 110) | [–] | | 500 | 10000 |
| Ratio of flow rate first fluid (e.g., steam) in annular space 130/combined flow rate (liquid feed + $N_2$) inner tube 120 | [–] | | 1 | 10 |
| Ratio of outer tube ID/inner tube ID | [–] | $D_O/D_I$ | 1.2 | 10 |
| Ratio of annular space 130 inside riser tube R120 ($W_R$)/reactor ID ($D_R$) | [–] | $W_R/D_R$ | 0.05 | 0.3 |
| Ratio of inner tube 120 ID $D_I$/Innertube length (level C-level A) (H in FIG. 2A) | [–] | $D_I/L_I$ | 100 | 1000 |
| Ratio of orifice ID $D_T$/outer tube ID $D_O$ | [–] | $D_T/D_O$ | 0.1 | 0.5 |
| Intermediate tube 170 ID/outer tube ID | [–] | | 1.05 | 1.2 |
| Outer portion annulus R120B, $W_{RO}$/inner portion annulus R120A, $W_{RI}$ | [–] | WA/WRO | 0.3 | 3 |
| Length of unshielded section U/nozzle length H | [–] | U/H | 0.1 | 1 |

TABLE 2

Pilot-Scale Nozzle Dimensions (all in cm)

| Dimension | Value |
|---|---|
| H | 2.5 |
| $D_T$ | 0.1 |
| $D_R$ | 0.94 |
| $D_O$ | 0.53 |
| $D_I$ | 0.11 |
| $W_A$ | 0.19 |
| $W_R$ | 0.15 |

TABLE 3

Scale-Up Nozzle Design Variables

| Design Variable | Units | min | max |
|---|---|---|---|
| Residence time in inner tube 120 | [s] | 0.01 | 4 |
| Velocity in inner tube 120 | [m/s] | 0.1 | 100 |
| Reynolds number in inner tube 120 | [–] | 1 | 20000 |
| Heat transfer through inner tube 120 | [W/mm2] | 0.01 | 1 |
| Heat transfer to steam/$N_2$ (first gas in 130) and feed liquid with $N_2$ (in 120) | [W/mm2 outer tube inner area] | 0 | 1 |
| Residence time in annular space 130 | [s] | 0.01 | 10 |
| Velocity in annular space 130 (for narrowest portion of outer tubes having varying inside diameter) | [m/s] | 0.1 | 30 |
| Reynolds number in annular space 130 (for widest portion of outer tubes having varying inside diameter) | [–] | 1 | 20000 |
| CFP Oil in Oil mixture | [vol %] | 0.1 | 100 |
| Velocity at tip/outlet (combined stream/mass exiting at tip 110) | [m/s] | 4 | 200 |

TABLE 3-continued

Scale-Up Nozzle Design Variables

| Design Variable | Units | | min | max |
|---|---|---|---|---|
| Reynolds number at tip/outlet (combined stream/mass exiting at tip 110) | [–] | | 200 | 20000 |
| Ratio of flow rate first fluid (e.g., steam) in annular space 130/combined flow rate (liquid feed + $N_2$) inner tube 120 | [–] | | 0.1 | 30 |
| Ratio of outer tube ID/inner tube ID | [–] | $D_O/D_I$ | 1.1 | 20 |
| Ratio of annular space 130 inside riser tube R120 ($W_R$)/reactor ID ($D_R$) | [–] | $W_R/D_R$ | 0.02 | 0.5 |
| Ratio of inner tube 120 ID $D_I$/Inner tube length (level C-level A) (H in FIG. 2A) | [–] | $D_I/L_I$ | 5 | 5000 |
| Ratio of orifice ID $D_T$/outer tube ID $D_O$ | [–] | $D_T/D_O$ | 0.01 | 1 |
| Intermediate tube 170 D' ID/outertube ID | [–] | | 1.01 | 2 |
| Outer portion annulus R120B, $W_{RO}$/inner portion annulus R120A, $W_{RI}$ | [–] | WA/WRO | 0.1 | 10 |
| Length of unshielded section U/nozzle length H | [–] | U/H | 0 | 100 |

Referring again to FIG. 2B, in some embodiments of the present disclosure, the inner tube 120 has an inside diameter $D_I$ and the outer tube 140 has an inside diameter $D_O$, such that a ratio of $D_O$ to $D_I$ may be between about 1.1 and about 20. In some embodiments of the present disclosure, the tip 110 may have an inside diameter $D_T$ (not shown), such that a ratio of $D_T$ to $D_O$ may be between about 0.01 and about 1.0. In some embodiments of the present disclosure, the annular space 130 may be configured so that the first fluid may have a velocity between about 0.1 m/s and about 30 m/s. In some embodiments of the present disclosure, $D_I$ may be configured so that the fluid may have a velocity between about 0.1 m/s and about 100 m/s. In some embodiments of the present disclosure, $D_T$ may be configured so that the combination of the liquid feed (e.g., CFP oil/VGO) and the first fluid may have a velocity between about 4 m/s and about 200 m/s. In some embodiments of the present disclosure, the annular space 130 may be configured so that the first fluid may have a Reynolds number between about 1 and about 20,000. In some embodiments of the present disclosure, a ratio of $D_I$ to H (Level C-Level B) may be between about 5 and about 5,000.

Figure 2C:
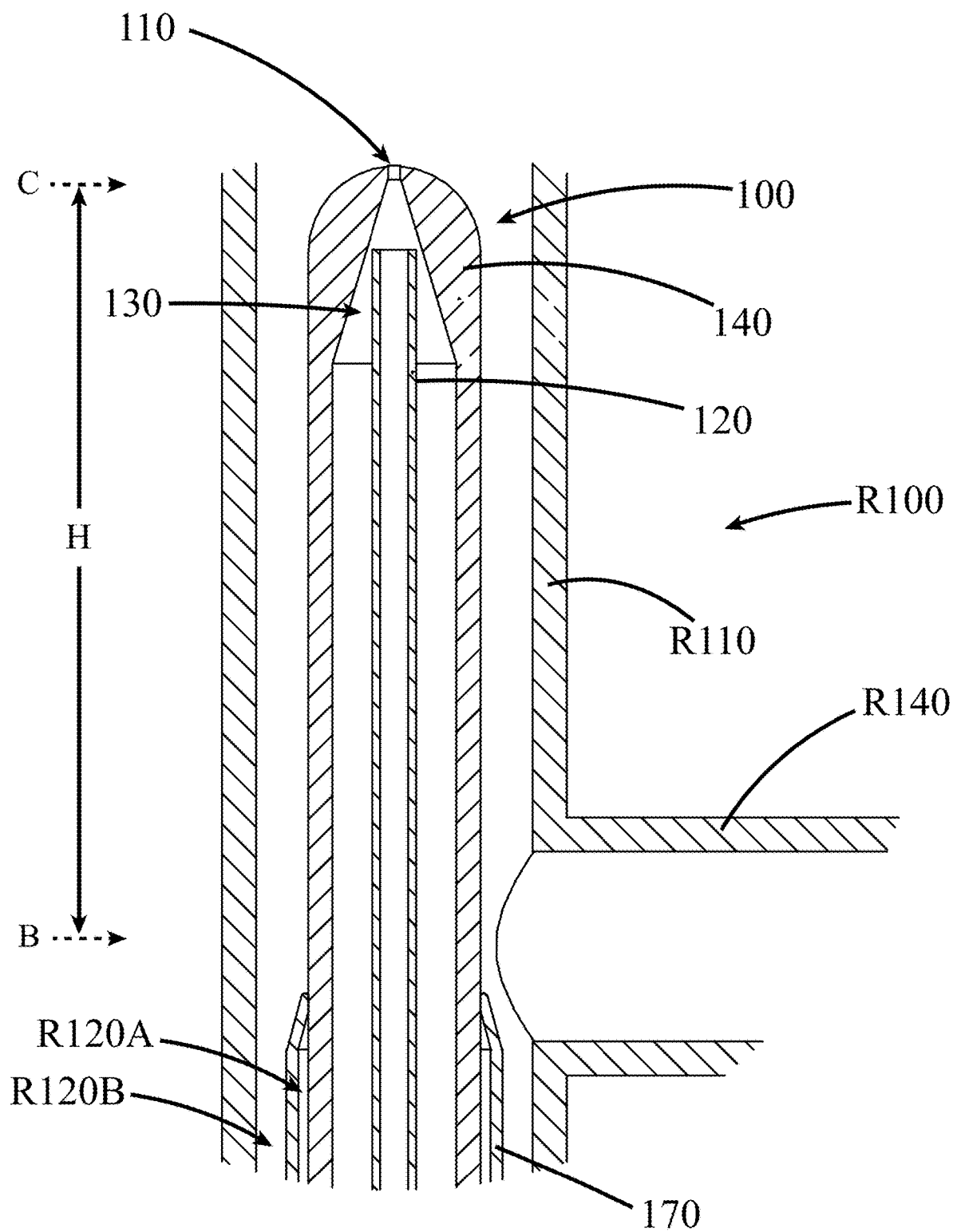
Figure 2D:
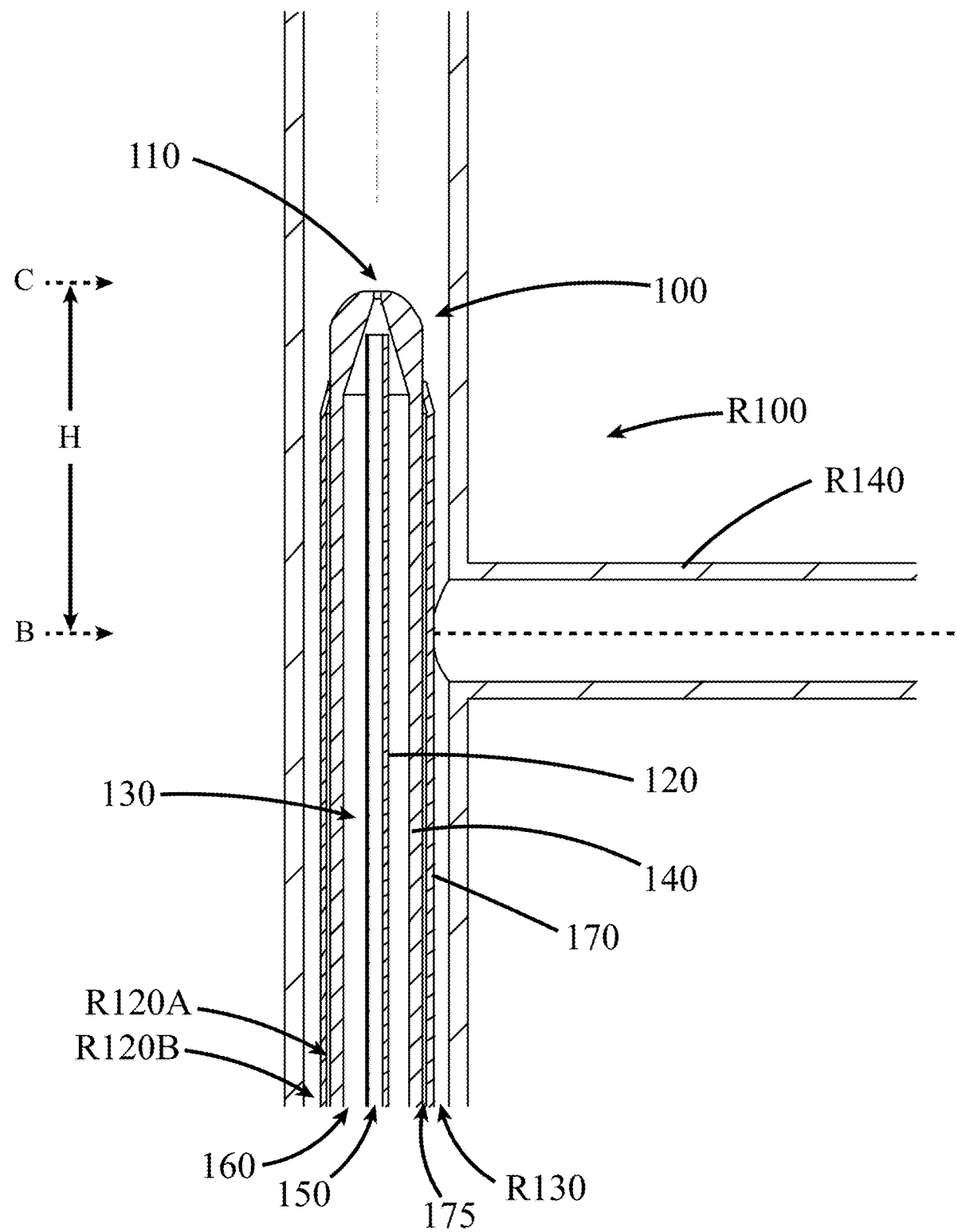

Referring to FIGS. 2C and 2D, these figures illustrate differences in the height of the first intermediate tube 170 relative to the catalyst feed line R140 and the tip 110. Referring to FIG. 2C, in some embodiments of the present disclosure, a first intermediate tube 170 may extend from the proximal end (not shown) of the inner tube 120 to the point where the catalyst is directed into the reactor R100 to the level of the catalyst feed line R140 (Level B). In this case, the first intermediate tube 170 does not obstruct the flow path of the catalyst. Referring to FIG. 2D, in some embodiments of the present disclosure, a first intermediate tube 170 may extend from the proximal end (not shown) of the inner tube 120 to just below the tip 110 of the nozzle 100; e.g., approximately at Level C. This design maximizes the amount of insulation/cooling provided to the nozzle by the first intermediate tube 170.

The tips 110 illustrated in FIGS. 2A, 2C, and 2D each have a taper in the wall of the outer tube 140. Among other things, such a tapered tip design may provide a longer narrow passage for the first gas at the nozzle tip 110, which may result in higher pressure drops in the annular space 130 near the distal end of the inner tube 120, which subsequently may prevent backflow of liquid from the nozzle tip to the annular space 130. Backflow may result, for example, from fluctuating reactor pressures. Further, referring to FIG. 2F, a reduced width of annular space 130, near the distal end of the inner tube 120, has been introduced, thereby increasing the fluid velocity of the first fluid flowing through the annular space 130. This design may provide a larger fluid velocity and pressure drop for a given flow rate, due to the length of the restriction and help with atomization in the nozzle tip. The annular space may further contain a mechanical insert that increases the velocity and/or creates a swirl, such as channels or holes aligned at angles other than 0 degrees with the axis of the inner tube 120 (FIG. 3). Further, the exemplary nozzle tips 110 shown in each of FIGS. 2A, 2C, 2D, and 2E include an inner tube 120 with a distal end that is cut at about a 90 degree angle relative to the y-axis of the inner tube. As shown in FIG. 3, in some embodiments of the present disclosure, the distal end of an inner tube 120 may be cut at an angle, i.e., cut at an angle other than 90 degrees, for example between 90 degrees and 30 degrees. In some embodiments of the present disclosure, the inner tube 120 may be narrower in inner diameter at the distal end compared to the remaining length (see FIG. 2F). This will increase the velocity and pressure drop near the tip, but reduce the pressure drop in the remaining section, resulting in an overall lower pressure drop compared to a straight tube. Referring again to FIG. 2F, in some embodiments of the present disclosure, an inner portion of the reactor annular space R120A may be utilized to provide a coolant supply and return. For example, a coolant may be provided to the reactor annular space may include water, steam, and glycol-based, organic, inorganic heat transfer fluids, or combinations thereof.

Figure 2E:
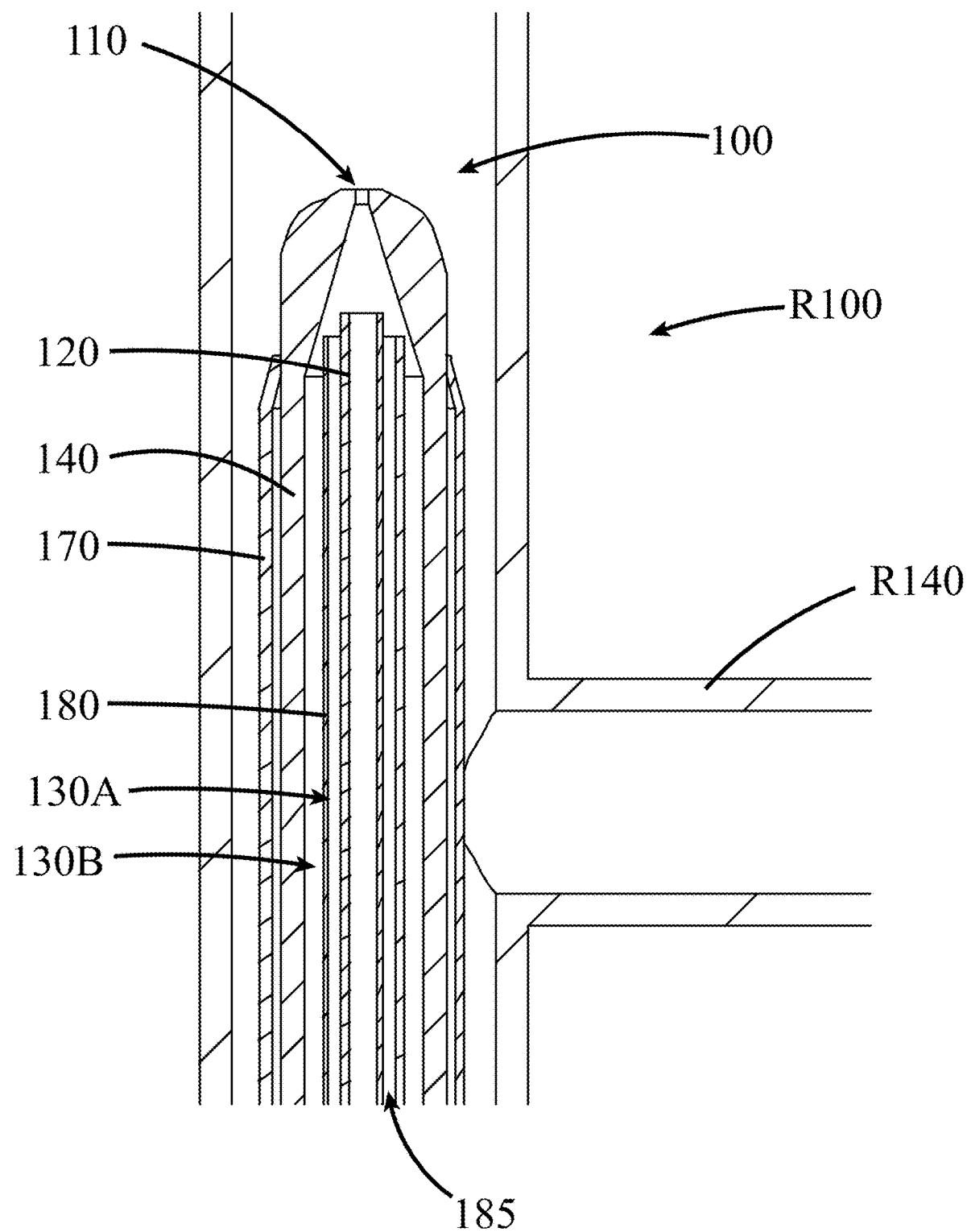
Figure 3:
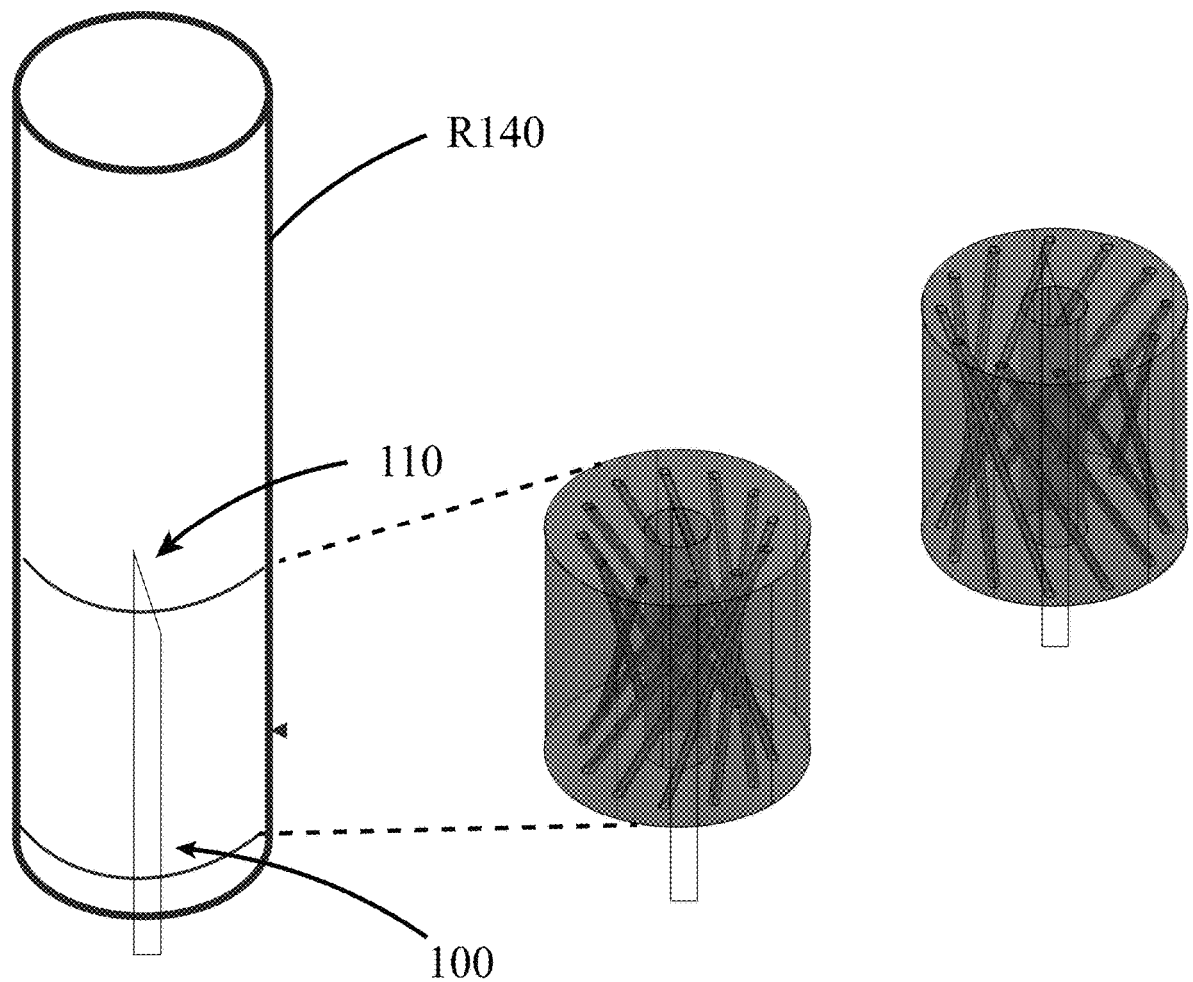
FIG. 3 illustrates an additional nozzle design, according to some embodiments of the present disclosure.

FIG. 2E illustrates another nozzle design, according to some embodiments of the present disclosure. This exemplary nozzle 100 is similar to the nozzles 100 illustrated in FIGS. 2A, 2C, and 2D but adds an additional element, a second intermediate tube 180 positioned in the annular space 130 between the outer wall of the inner tube 120 and the inner wall of the outer tube 140. A second intermediate tube 180, therefore, divides the annular space 130 into an inner portion 130A and an outer portion 130B. Among other things, the inner portion of the annular space 130A may receive a fourth fluid (not shown) through a fourth inlet 185 positioned towards the proximal end of the inner tube 120. This design may be advantageous when two non-miscible feed liquids are to be used, in which case one liquid may be introduced to the reactor via the inner tube 120, while the second liquid may be directed to the reactor through the inner annular space 130A. Thus, among other things, the second liquid may provide a heat barrier so that the first liquid may be maintained at a relatively cooler temperature; the inside wall of tube 120 will be maintained at a colder temperature due to the second intermediate tube 180 and/or a fourth liquid flowing the inner portion of the annular space 130A created by the addition of the second intermediate tube 180.

Figure 2F:
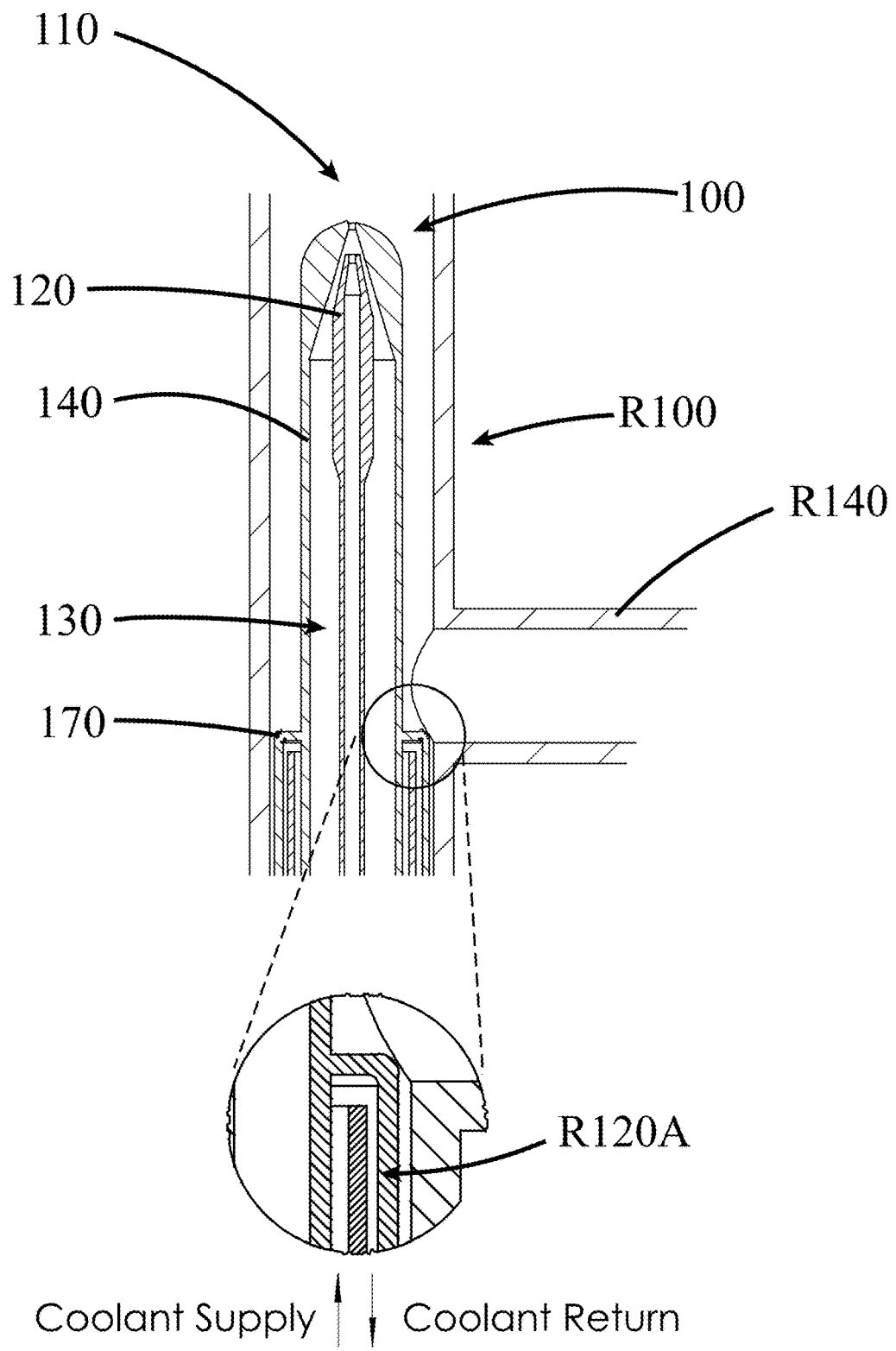
Figure 2G:
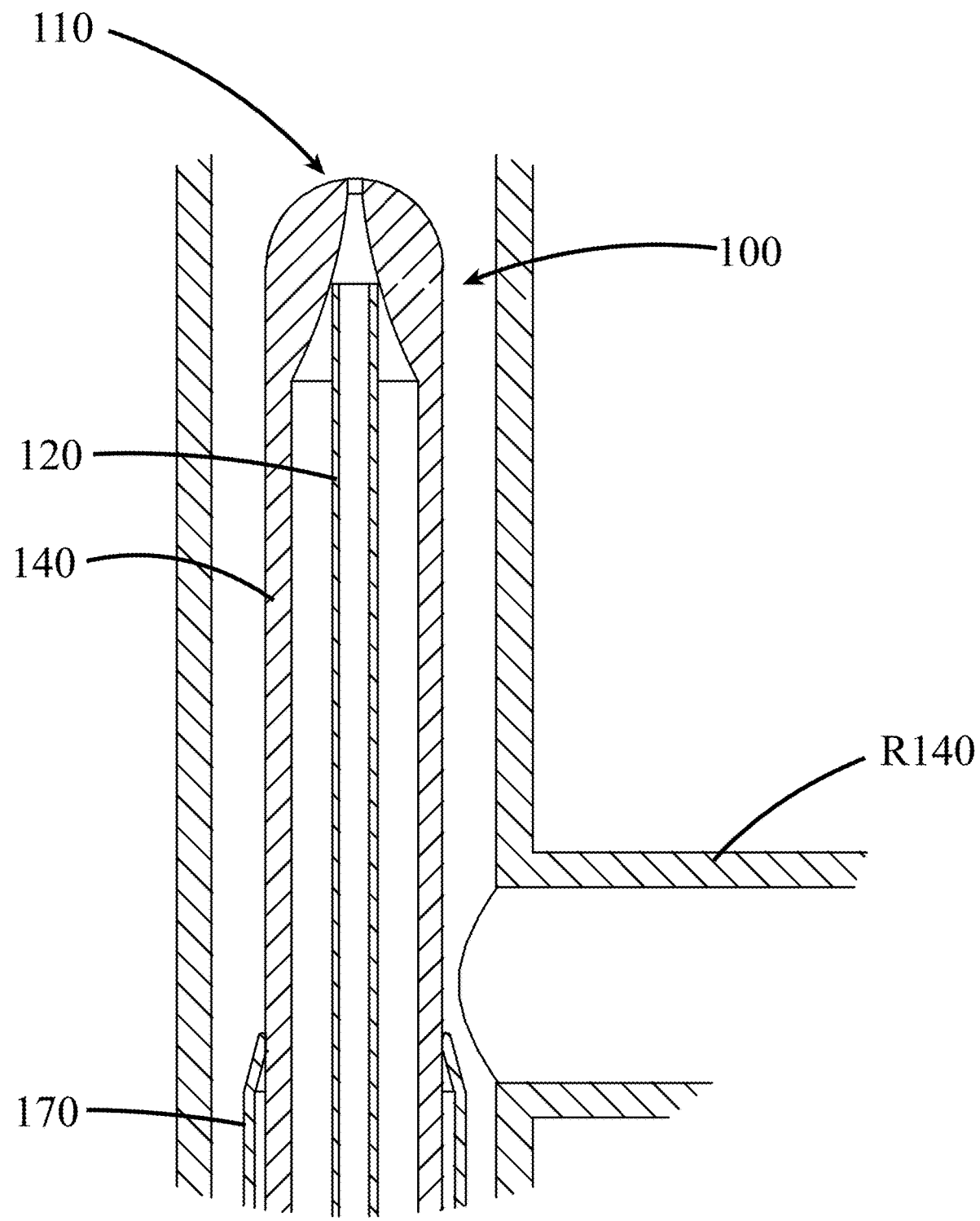

FIG. 2G illustrates an example of a nozzle 100 having a slightly different tip 110. In this example, the taper of the inner wall of the outer tube 140 is not linear but instead has some curvature. Among other things, such curvature may provide a venturi effect to help sweep the liquid feed, etc., through the nozzle tip 110.

Referring again to FIG. 2A, in some embodiments of the present disclosure, one or more of the tubes shown (e.g., R110, 170, 140, and/or 120) may include a section that has a thicker wall, such that the cross-sectional area of the corresponding annular space (e.g., 130, R120B) is reduced. Like reducing the nozzle tip 110, such a restriction can increase the local fluid velocity, which can in turn, among other things, minimize the back-mixing of streams, provide higher or lower local heat-transfer coefficients, etc.

Experimental:

An "incumbent nozzle" design was compared to a nozzle, referred to below as a "modified nozzle", according to some embodiments of the present disclosure. FIG. 2C illustrates the basic design used for the modified nozzle, whereas the incumbent nozzle did not include a first intermediate tube 170 (i.e., heat shield). The incumbent nozzle 100 was constructed of a 1/16-inch stainless-steel inner tube 120 positioned within a 1/4-inch stainless-steel outer tube 140. The inner diameters of the inner and outer tubes were 0.0305 inch and 0.18 inch ($R_I$ and $R_O$), respectively. The nozzle tip 110 was located 8 inches (H) above the catalyst feed line R140. The liquid feed (e.g., oil blend of bio-oil and VGO) and nitrogen were directed to the inner tube 120, and steam and nitrogen (i.e., first gas) directed to the annular space 130 between the inner and outer tubes. The reactor tube was approximately 1/2 inch in diameter. The horizontal catalyst feed line was approximately 3/8 inch in diameter. In both instances, $N_2$ was mainly used as a purge to keep pressure tap lines clean, which are used for example, to differential pressure for estimating flow rates. A small stream of $N_2$ prevents either liquid feed or steam from flowing toward the pressure instruments (gauges and transducers). Additionally, as the $N_2$ was at a higher pressure than the reactor, the increased pressure may further assist the fluids (liquid feed, steam) to flow towards the reactor.

The modified nozzle was modified to include the following: Length (H): The position of the nozzle tip 110 relative to the catalyst feed line R140 was reduced from 8 inches above the catalyst feed line to 1 inch. This reduced the length of the inner and outer tube and the amount of heat transfer occurring from the hot catalyst to the liquid feed (a mixture of 5 vol % CFP oil/95 vol % VGO). Materials of construction: The original stainless steel of the 1/16-inch inner tube and the 1/4-inch outer tube were both replaced with titanium. Titanium has less catalytic activity than stainless steel. Steel can promote unwanted surface reactions of the CFP oil. The inner diameters of the inner and outer tubes were increased to 0.0428 inch and 0.21 inch, respectively.

Figure 5A:
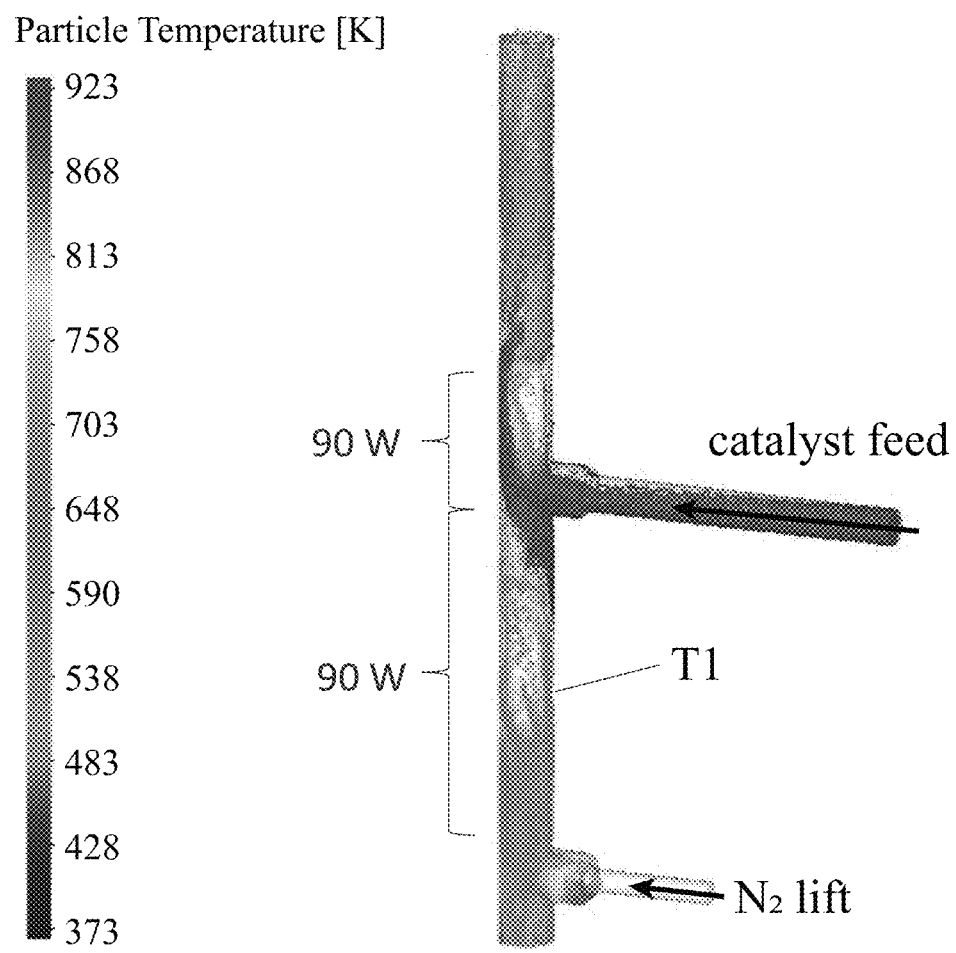
FIGS. 5A and 5B compare computational fluid dynamic predictions comparing the performance of a nozzle without and with the use of a mechanical insert positioned within an annular space, respectively, according to some embodiments of the present disclosure.
Figure 5B:
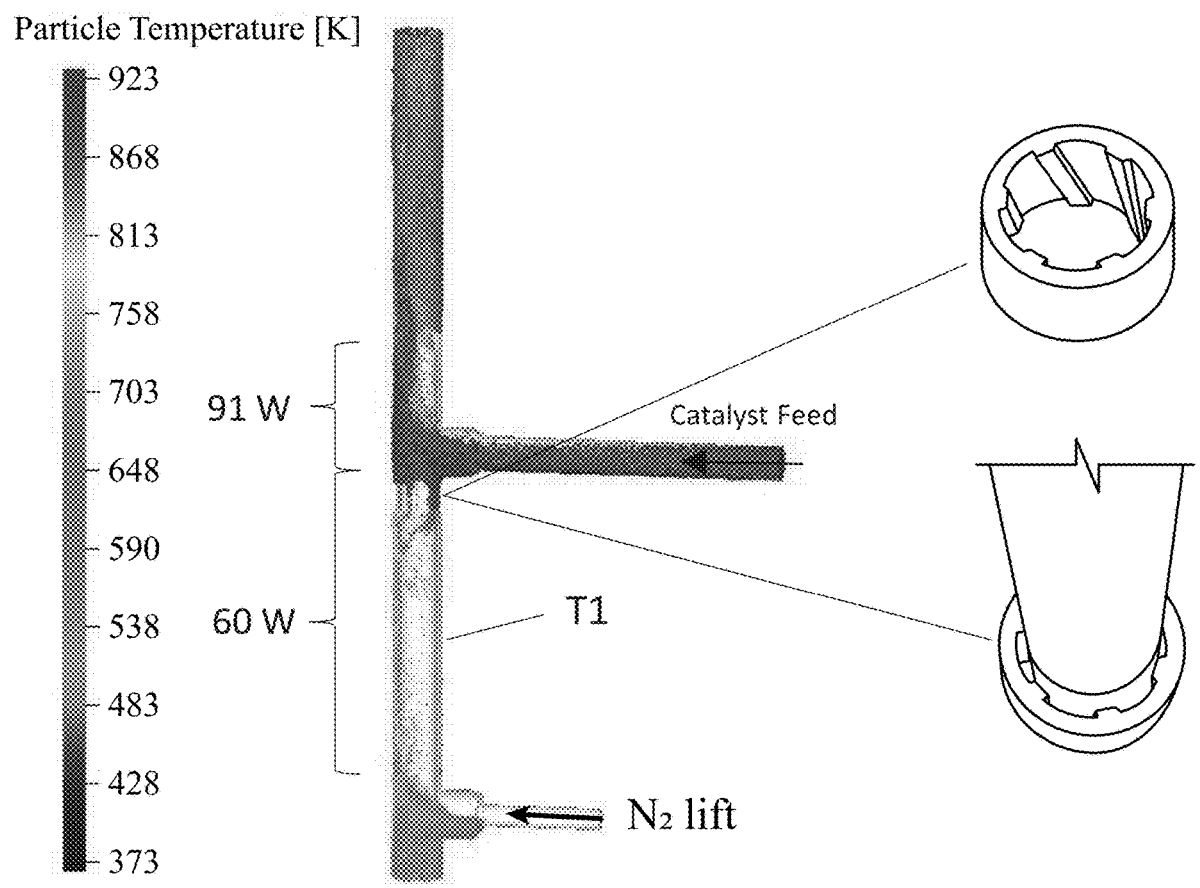

Referring again to FIG. 2C, a modified nozzle 100 was constructed using a 1/4-inch outer diameter tube 140 with 0.035-inch wall thickness surrounded by a 5/16-inch outer diameter stainless-steel first intermediate tube 170 with an inner diameter, D', of 0.281 inch. The distal end of the intermediate tube 170 was crimped, but not completely plugged, to minimize the backflow of solid catalyst from the second portion of the reactor annular space R120B into the first portion of the reactor annular space R120A. In this exemplary nozzle 100, the first intermediate tube 170 reduced heat transfer from the catalyst to the steam and nitrogen (i.e., first fluid) flowing through the annular space 130, which in turn reduced heat transfer to the liquid feed/nitrogen mixture flowing through the inner tube 120. Another purpose of the first intermediate tube 170 was to narrow the reactor annular gap R120A between the first intermediate tube 170 and the reactor wall R110. This increased the velocity of the fluidizing nitrogen (introduced at the bottom of the outer reactor annular gap R120B), resulting in less of the solid catalyst circulating into the annular gap R120B. This resulted in an oil mixture flowing through a larger section of the inner tube 120, i.e., a larger percentage of the nozzle length, H, that was thermally uninsulated by the first intermediate tube 170 and not actively cooled by the first fluid (e.g., heat transfer fluid) flowing through the inner reactor annular space R120A, and instead being heated by the hot catalyst flowing through the outer reactor annular space R120B. Additional narrowing of the reactor annular space R120B may be achieved by a mechanical insert with channels or holes through which the second fluid is directed, increasing its velocity. The channels or holes may be arranged at angles other than zero with the inner tube 120 to create a swirling motion of the flow. FIG. 5B shows that this configuration, based on computational fluid dynamic calculations, results in a lower heat transfer to the intermediate tube 170 (60 W versus 90 W in FIG. 5A). Experimentally, this was confirmed by a lower surface temperature of the outside reactor wall (T1=453° C. in FIG. 5B versus T1=488° C. in FIG. 5A). As stated above, one reason for exposing the feed liquid flowing through the inner tube 120 may be to increase its temperature to attain a target fluid viscosity, as long as it does not excessively increase its temperature, which can lead to coking.

Figure 4:
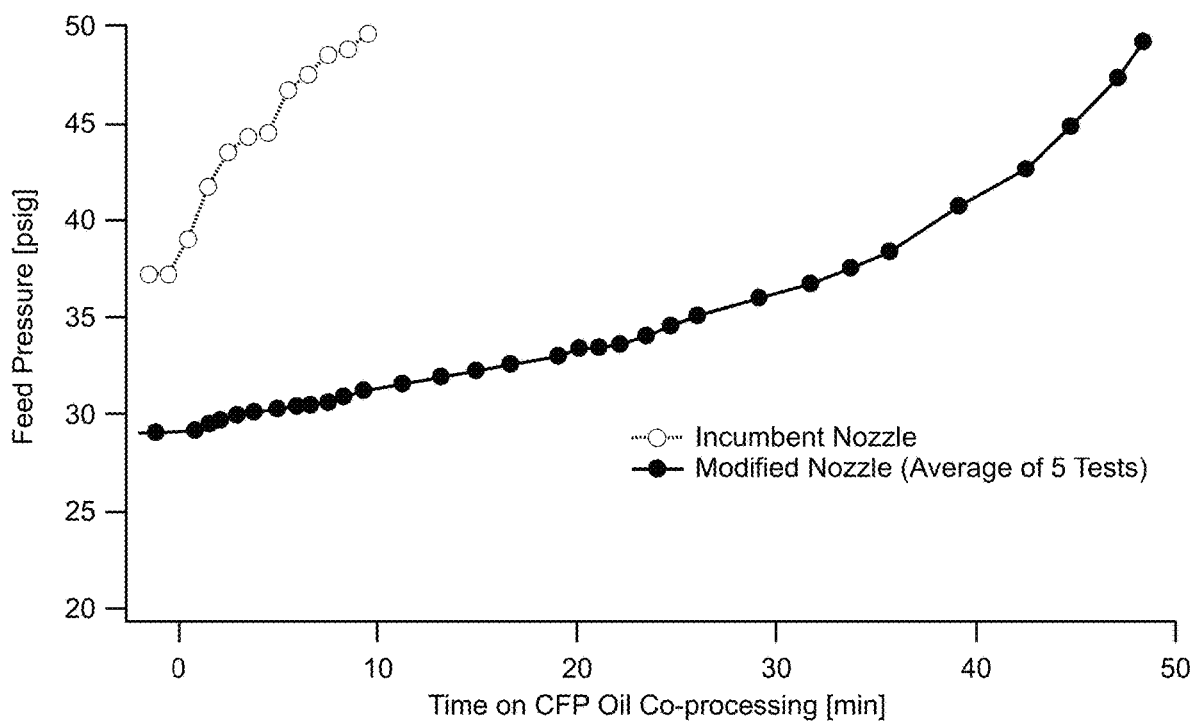
FIG. 4 illustrates feed pressure increases after introduction of CFP oil as a function of time for a prototype nozzle and a modified nozzle used during co-processing with VGO, according to some embodiments of the present disclosure.

Table 4 shows the results of six coprocessing tests (5 vol % CFP oil with 95 vol % VGO). Plugging was measured by feed pressure changes during co-processing: when the feed pressure reached 47 psig, a test was ended. One baseline test was conducted with the incumbent nozzle and five tests were conducted with the modified nozzle (as shown in FIG. 2A with a heat shield). The initial feed pressures were recorded after starting to co-process CFP oil and VGO. In the case of the incumbent nozzle, the initial feed pressure was higher since the inner tube 120 was longer and had a smaller inner diameter. The reactor pressure downstream of the nozzle tip 110 was about 25 psig. FIG. 4 illustrates the results of the feed pressure over time. For the modified nozzle, the data was time-averaged over the five tests. The run times were significantly longer using the modified nozzle compared to the incumbent nozzle, and they approached steady-state operation of the DCR. All tests, both incumbent and modified nozzles, were conducted with a 1/16-inch inner tube 120, and the pressures for the incumbent nozzle started to increase after a very short time, but the rate of pressure increase was significantly slower for the modified nozzle relative to the incumbent nozzle.

TABLE 4

Results of co-processing CFP oil with VGO using incumbent and modified nozzles

| Nozzle type | Initial feed pressure [psig] | Time of co-processing until 47 psig (from plugging) [min] | Average pressure increase [psi/min] |
|---|---|---|---|
| Incumbent nozzle | 37 | 6 | 1.67 |
| Modified nozzle-run 1 | 29 | 26 | 0.69 |
| Modified nozzle-run 2 | 29 | 62 | 0.29 |
| Modified nozzle-run 3 | 29 | 28 | 0.64 |
| Modified nozzle-run 4 | 28 | 58 | 0.33 |
| Modified nozzle-run 5 | 28 | 65 | 0.29 |

Additional nozzle modifications are under development that have not yet been tested. These modifications include: Feeding bio-oil with a 1/16-inch outer diameter (0.010-inch wall thickness) tube 120 inside a 1/8-inch outer diameter (0.015-inch wall thickness) for VGO (see FIG. 2E). This configuration may, among other things, reduce the temperature of the CFP oil further while preventing direct contact of CFP oil with VGO. In some embodiments of the present disclosure, as described above, vacuum insulation and/or physical insulation (e.g., a ceramic) may be positioned within at least a portion of the outer portion of the reactor annular gap R120A created by the intermediate tube 170, as shown in FIG. 2A. Among other things, the use of insulation in the inner portion of the reactor annular space R120A may reduce heat transfer to the oil mixture flowing through the inner tube 120 and may further prevent the entrainment of fluid and dust into the inner portion of the reactor annular space R120A. In some embodiments of the present disclosure, the inner portion of the reactor annular space R120A may be configured to receive a heat-transfer fluid to "actively" cool at least one of the following: the oil mixture flowing through the inner tube 120 and/or the first fluid flowing through annular space 130 and/or the solid catalyst and/or second gas flowing through the outer portion of the reactor annular space R120B. In some embodiments of the present disclosure, a heat-transfer fluid may include liquid water, such that at least a portion of the water is vaporized. By feeding water at a precise rate, the evaporation into steam below the nozzle tip may provide extra cooling and prevent heating the oil mixture stream. A pressure feed-back control loop (based on the pressure as well as fluctuation of the pressure, i.e., standard deviation) may be used to determine the required water feed rate.

For longer nozzles, the outside of the outer tube 140 may be cooled by high-pressure circulating water or oil. Referring to FIG. 2F, the inner portion of the reactor annular space R120A may be further divided into a coolant supply line and a coolant return line. In some embodiments of the present disclosure, this type of arrangement may keep the steam cooler, which in turn will keep the liquid feed colder. By adding an additional concentric tube inside the annular gap R120A, water may be guided along the inside gap, cooling the outside of tube 140 and then flowing back in the outer region of gap R120A. In some embodiments of the present disclosure, generating a micro-emulsion between CFP oil and VGO at the mixing point may prevent the CFP oil from accumulating on the hot surfaces inside the inner tube 120. A micro-emulsion may be created by high-shear mixing or the use of ultra-sonic waves.

For long operating times, plugging of the nozzle tip 110 may be prevented by a metal-alloy rod/wire that is inserted into the inner tube 120 and that can be mechanically forced through the nozzle tip 110 for a very short time and immediately retracted thereafter back into the inner tube 120. The diameter of the rod/wire must be slightly smaller than the opening of the nozzle tip 110, and significantly smaller than the inner diameter of the inner tube 120, as not to block the liquid flow in the inner tube 120.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device for directing a liquid to a reactor, the device comprising:
   an inner tube positioned concentrically within an outer tube, creating a first annular space between an outer wall of the inner tube and an inner wall of the outer tube; and
   a first intermediate tube positioned concentrically around the outer tube, creating a second annular space, wherein:
   the first intermediate tube has a proximal end and a distal end,
   the inner tube has a proximal end and a distal end,
   the outer tube has a proximal end and a distal end,
   the proximal end of the inner tube is configured to receive the liquid,
   a portion of the first annular space in a proximity near the proximal end of the inner tube and the proximal end of the outer tube is configured to receive a first gas,
   the distal end of the inner tube contains an outlet configured to release the liquid,
   the distal end of the inner tube and the distal end of the outer tube are substantially aligned and form a gap between the outer wall of the inner tube and the inner wall of the outer tube,
   the gap is configured to direct the first gas to the liquid exiting the second end of the inner tube, and
   the second end of the outer tube terminates with a tip configured to mix the liquid with the first gas and to direct the liquid and the first gas into the reactor.

2. The device of claim 1, wherein:
   the inner tube has an inside diameter $D_I$,
   the outer tube has an inside diameter $D_O$, and
   a ratio of $D_O$ to $D_I$ is between about 1.1 and about 20.

3. The device of claim 2, wherein:
   the tip has an inside diameter $D_T$, and
   a ratio of $D_T$ to $D_O$ is between about 0.01 and about 1.0.

4. The device of claim 2, wherein the first annular space is configured so that the first gas has a velocity between about 0.1 m/s and about 30 m/s.

5. The device of claim 2, wherein $D_I$ is configured so that the liquid has a velocity between about 0.1 m/s and about 100 m/s.

6. The device of claim 3, wherein $D_T$ is configured so that the combination of the liquid and the first gas have a velocity between about 4 m/s and about 200 m/s.

7. The device of claim 2, wherein the first annular space is configured so that the first gas has a Reynolds number between about 1 and about 20,000.

8. The device of claim 1, wherein:
   the first intermediate tube is configured to be positioned concentrically within a tubular portion of the reactor,
   the tubular portion has a wall with an inner surface, and
   the outer surface of the outer tube and the inner surface of tubular portion form a third annular space.

9. The device of claim 8, wherein:
   the tubular portion is configured to receive a flow comprising a solid and a second gas,
   the flow is configured to be directed to the third annular space at a reference Point B,
   the flow is configured to flow substantially parallel with the first gas, and
   the outer tube has a length (H) defined as the distance between the tip (Point C) and Point B.

10. The device of claim 9, wherein a ratio of $D_I$ to H is between about 5 and about 5,000.

11. The device of claim 1, wherein at least one of the inner tube, the outer tube, or the first intermediate tube is constructed of titanium.

12. The device of claim 9, wherein the first intermediate tube has a length (U) between Point B and the distal end of the first intermediate tube, Point D, that defines a ratio of U to H between about 0 and 100.

13. The device of claim 12, wherein the ratio of U to H is between 0 and 1.0.

14. The device of claim 3, wherein the intermediate tube has an inside diameter, D', that defines a ratio of D' to $D_O$ between greater than 1 and about 2.0.

15. The device of claim 8, wherein:
   the second annular space has a width $W_{RI}$ defined by the distance between the outer wall of the outer tube and the inner wall of the first intermediate tube,
   the third annular space has a width $W_{RO}$ defined by the distance between the outer wall of the first intermediate tube and the inner wall of the tubular portion of the reactor, and
   a ratio of $W_{RO}$ to $W_{RI}$ is between about 0.1 and about 10.

16. The device of claim 1, wherein the distal end of the first intermediate tube contacts and terminates at the outer wall of the outer tube.

17. The device of claim 1, wherein the second annular space is configured to receive a heat transfer fluid.

18. The device of claim 1, further comprising:
   a second intermediate tube positioned concentrically between the inner tube and the outer tube, wherein:
   the second intermediate tube has a proximal end and a distal end, and
   the second intermediate tube divides the first annular space into an inner portion between the outer wall of the inner tube and the inner wall of the outer tube and an outer portion between the outer wall of the second intermediate tube and the inner wall of the outer tube.

19. The device of claim 18, wherein:
   the inner portion of the first annular space near the distal end of the second intermediate tube is configured to receive a third gas,
   the distal end of the second intermediate tube is positioned near the distal end of the inner tube, and
   the distal end of the second intermediate tube is configured to discharge the third gas.

20. The device of claim 1, wherein:
   the reactor comprises a circulating fluidized bed reactor, and
   the liquid comprises a pyrolysis oil and a vacuum gas oil.

21. The device of claim 9, further comprising a mechanical insert positioned within the third annular space below Point B.

* * * * *